(12) United States Patent
Kondo

(10) Patent No.: US 10,495,011 B2
(45) Date of Patent: Dec. 3, 2019

(54) VIBRATION SUPPRESSION DEVICE OF VEHICLE

(71) Applicant: KABUSHIKI KAISHA TOYOTA JIDOSHOKKI, Kariya-shi, Aichi-ken (JP)

(72) Inventor: Mitsuru Kondo, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/940,067

(22) Filed: Mar. 29, 2018

(65) Prior Publication Data

US 2018/0283299 A1 Oct. 4, 2018

(30) Foreign Application Priority Data

Apr. 3, 2017 (JP) .................. 2017-073884

(51) Int. Cl.
 *F02D 41/00* (2006.01)
 *F02D 41/40* (2006.01)
 *F02D 41/14* (2006.01)
 *F02D 41/24* (2006.01)
 (Continued)

(52) U.S. Cl.
 CPC .......... *F02D 41/0085* (2013.01); *F02D 29/02* (2013.01); *F02D 35/023* (2013.01); *F02D 41/1498* (2013.01); *F02D 41/2467* (2013.01); *F02D 41/40* (2013.01); *F02D 2200/1002* (2013.01); *F02D 2200/1004* (2013.01);
 (Continued)

(58) Field of Classification Search
 CPC ...... F02D 41/0085; F02D 29/02; F02D 41/40; F02D 2200/1002; F02D 2250/28; F02D 2009/0233; F02B 75/06
 See application file for complete search history.

(56) References Cited

U.S. PATENT DOCUMENTS 4,197,767 A * 4/1980 Leung .................. F02D 35/023
 123/179.16
4,357,662 A * 11/1982 Schira ................. F02D 41/1498
 123/406.24

(Continued)

FOREIGN PATENT DOCUMENTS

JP 2003-502555 A 1/2003

*Primary Examiner* — Hung Q Nguyen
*Assistant Examiner* — Brian P Monahon
(74) *Attorney, Agent, or Firm* — Sughrue Mion, PLLC

(57) ABSTRACT

A vibration suppression device of a vehicle includes a controller, a memory a vibration detector. The controller determines whether the vehicle is in a normal driving condition. The controller obtains data of a longitudinal vibration of the vehicle from the vibration detector. The controller determines whether a vibration level corresponding to a reference frequency band is greater than a vibration level threshold. The controller calculates a torque generated by each cylinder and a correction amount for the fuel injection amount for each cylinder so that a torque difference among the plurality of cylinders is reduced. The controller corrects the command fuel injection amount for each cylinder based on the calculated correction amount, controls each fuel injection device based on the corrected command fuel injection amount, and stores the calculated correction amount in the memory member.

5 Claims, 7 Drawing Sheets

(51) Int. Cl.
*F02D 29/02* (2006.01)
*F02D 35/02* (2006.01)

(52) U.S. Cl.
CPC .... *F02D 2200/50* (2013.01); *F02D 2200/602* (2013.01); *F02D 2250/28* (2013.01)

(56) References Cited

U.S. PATENT DOCUMENTS

| | | | | |
|---|---|---|---|---|
| 4,928,652 A * | 5/1990 | Shinya | ............... | F02D 41/1498 123/406.19 |
| 6,065,449 A * | 5/2000 | Fukuma | ............... | F02D 41/1497 123/357 |
| 6,412,469 B1 * | 7/2002 | Itoyama | ............... | F02D 41/008 123/299 |
| 6,718,943 B1 | 4/2004 | De La Salle et al. | | |
| 7,219,003 B2 * | 5/2007 | Hagel | ............... | F02D 41/1498 123/436 |
| 7,823,566 B2 * | 11/2010 | Fox | ............... | F02B 75/06 123/192.1 |
| 9,494,098 B2 * | 11/2016 | Ogata | ............... | G01H 17/00 |
| 2007/0061047 A1 * | 3/2007 | Sato | ............... | G05D 19/02 700/280 |
| 2008/0091335 A1 * | 4/2008 | Takemura | ............... | G01L 23/225 701/111 |
| 2008/0098969 A1 * | 5/2008 | Reed | ............... | F02D 13/0215 123/64 |
| 2008/0276904 A1 * | 11/2008 | Surnilla | ............... | F02D 41/0082 123/406.45 |
| 2009/0043475 A1 * | 2/2009 | Buslepp | ............... | F02D 35/023 701/101 |
| 2010/0250048 A1 * | 9/2010 | Kaedei | ............... | F02D 29/02 701/31.4 |
| 2012/0179332 A1 * | 7/2012 | Harima | ............... | F02D 41/1498 701/37 |
| 2014/0297164 A1 * | 10/2014 | Sawdon | ............... | F02D 35/027 701/111 |
| 2015/0354493 A1 * | 12/2015 | Jung | ............... | F02D 35/024 701/105 |
| 2016/0363081 A1 * | 12/2016 | Osaka | ............... | F02M 61/182 |
| 2018/0275017 A1 * | 9/2018 | Katayama | ............... | G01M 15/11 |

* cited by examiner

VIBRATION SUPPRESSION DEVICE OF VEHICLE

BACKGROUND ART

The present disclosure relates to an engine control of a vehicle, more specifically, a vibration suppression device of the vehicle that suppresses vibration caused by an engine.

An engine control of a vehicle is known in the art that suppress vibration of the vehicle by obtaining a vibration component of the rotation speed of an engine serving as a driving power source and adjusting an engine control parameter such as fuel injection amount so as to reduce the obtained vibration component.

Japanese Unexamined Patent Application Publication No. JP2003-502555 discloses an engine control of a vehicle that analyses an engine speed signal to identify an average engine speed and a vibration component and controls the torque of the engine so as to reduce the vibration component.

If there is an error between the command value for the engine to generate the desired torque and the actual torque generated based on the command value, the vibration component may not be reduced effectively, which prevents achieving the desired vibration suppression performance of the vehicle.

The present disclosure provides a vibration suppression device of a vehicle that appropriately controls the engine to suppress vibration of the vehicle.

SUMMARY

In accordance with an aspect of the present disclosure, there is provided a vibration suppression device of a vehicle, the vehicle including an engine equipped with a plurality of cylinders, each having a fuel injection device for fuel injection. The vibration suppression device includes a controller calculating a command fuel injection amount for each cylinder based on operating conditions of the engine and controlling each fuel injection device based on the calculated command fuel injection amount, a memory storing a correction amount for a fuel injection amount for each cylinder, and a vibration detector detecting a vibration of the vehicle. The controller determines whether the vehicle is in a normal driving condition. The controller obtains data of a longitudinal vibration of the vehicle from the vibration detector if the controller determines that the vehicle is in a normal driving condition. The controller determines whether a vibration level corresponding to a reference frequency band is greater than a vibration level threshold with regard to the data of the longitudinal vibration of the vehicle, wherein the reference frequency band are set depending on a rotation speed of the engine. The controller calculates a torque generated by each cylinder and a correction amount for the fuel injection amount for each cylinder so that a torque difference among the plurality of cylinders is reduced if the vibration level corresponding to the reference frequency band is greater than the vibration level threshold. The controller corrects the command fuel injection amount for each cylinder based on the calculated correction amount, controls each fuel injection device based on the corrected command fuel injection amount, and stores the calculated correction amount in the memory member.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof may best be understood by reference to the following description of the embodiments together with the accompanying drawings in which.

DETAILED DESCRIPTION OF THE EMBODIMENTS

Figure 1:
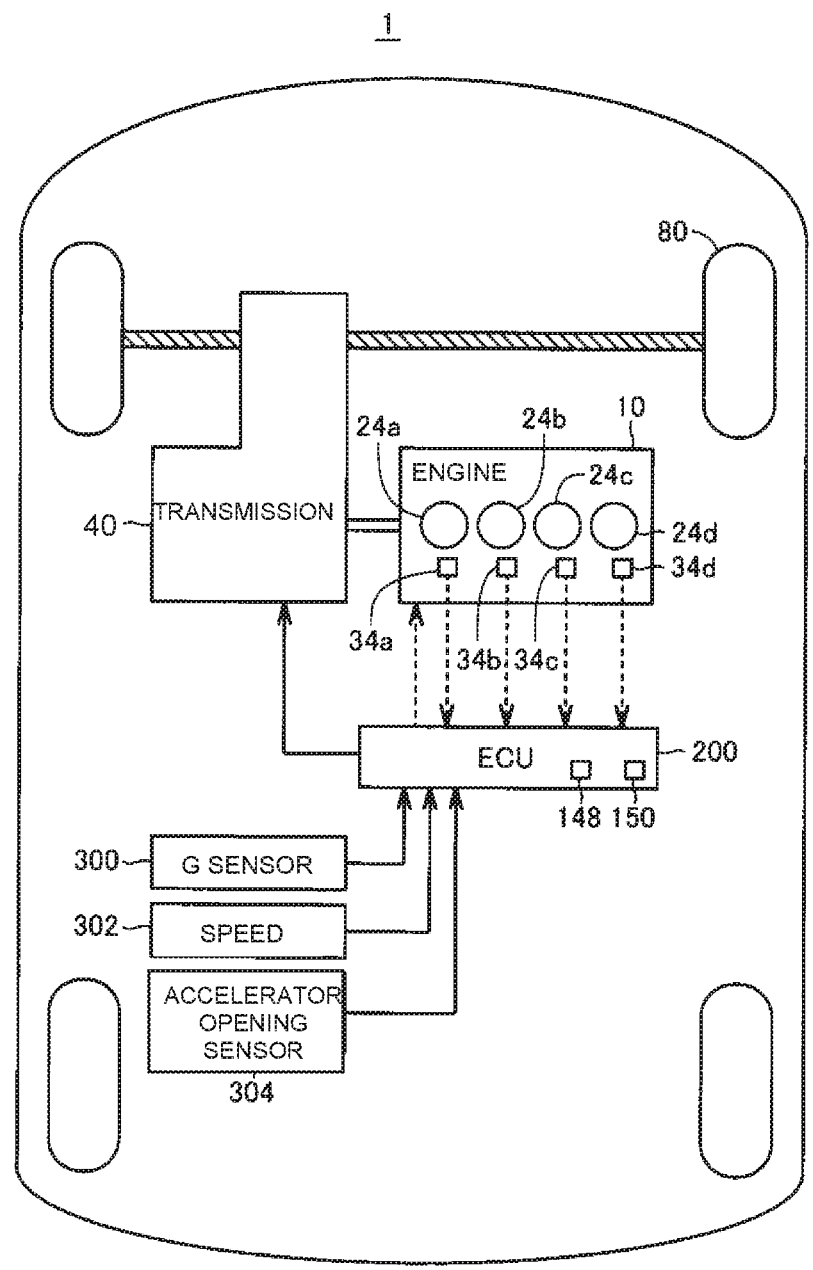
FIG. 1 is a schematic view of a vehicle having an engine and a vibration suppressing device according an embodiment of the present disclosure.

The following will describe an embodiment of the present disclosure with reference to the accompany drawings. It is to be noted that like or same parts or elements among the embodiment and its modifications are designated by the same reference numerals and the description thereof will not be reiterated.

FIG. 1 depicts a vehicle 1 having an engine 10. The following description will deal with the vehicle 1 equipped with the engine 16 that serves as a driving power source. It is to be noted, however, that the present disclosure is applicable to any vehicle having the engine 10 as a driving power source or as a generator. The vehicle 1 may be a hybrid vehicle that includes a motor generator as a driving power source in addition to or instead of the engine 10.

As shown in FIG. 1, the vehicle 1 includes the engine 10, a transmission 40, a pair of driven wheels 80, and an electronic control unit (ECU) 200.

The transmission 40 has an input shaft that is connected to a crank shaft of the engine 10 and an output shaft that is connected to the driven wheels 80 disposed on the left and right of the vehicle 1.

The transmission 40 includes a speed change gear and a differential gear (neither shown). The speed change gear may be provided by a stepped automatic transmission equipped with a planetary gear box, a stepless automatic transmission, or a manual transmission.

The engine 10 is an internal combustion engine such as a gasoline engine or a diesel engine. In the present disclosure, the engine 10 provided by a diesel engine will be described as an example. The engine 10 includes a plurality of cylinders, namely, a first cylinder 24a, a second cylinder 24b, a third cylinder 24c and a fourth cylinder 24d. The engine 10 further includes a first cylinder pressure sensor 34a for the measurement of pressure in the first cylinder 24a, a second cylinder pressure sensor 34b for the measurement of pressure in the second cylinder 24b, a third cylinder pressure sensor 34c for the measurement of pressure in the third cylinder 24c, and a fourth cylinder pressure sensor 34d for the measurement of pressure in the fourth cylinder 24d.

Figure 2:
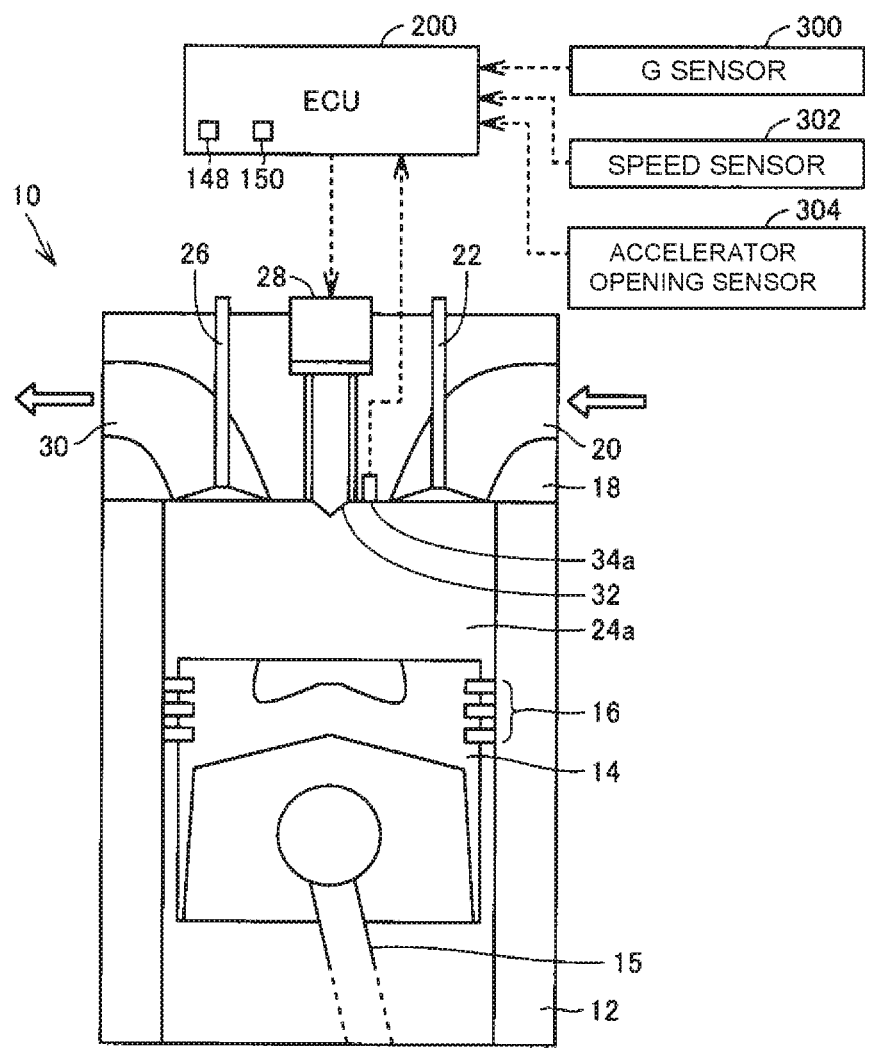
FIG. 2 is a schematic view of the engine.

The following will describe the configuration of the engine 10 to be mounted on the vehicle 1 with reference to FIG. 2. FIG. 2 depicts a schematic view, showing a cross section of the engine 10 in the vicinity of the first cylinder 24a.

As shown in FIG. 2, the engine 10 includes a piston 14, an intake valve 22, the first cylinder 24a, an exhaust valve 26, and a fuel injection valve 28. It is to be noted that arrows in FIG. 2 indicate flows of intake gas and exhaust gas while the engine 10 is being operated.

The piston 14 is reciprocally slidably received in the first cylinder 24a and connected to a crank shaft (not shown) through a connecting rod 15. A reciprocal motion of the piston 14 in the vertical direction is converted through the connecting rod 15 to a rotational motion of the crank shaft. The piston 14 is formed with ring grooves in which a plurality of piston rings 16 (e.g. three piston rings 16) are fitted.

The first cylinder 24a is formed by a cylinder block 12 and a cylinder head 18. The cylinder block 12 has a circular hole having its axis extending in the vertical direction in FIG. 1. The cylinder head 18 has an intake port 20 having one end connected to an intake manifold (not shown) and the other end connected to the first cylinder 24a of the cylinder block 12. The cylinder head 18 further has an exhaust port 30 having one end connected to an exhaust manifold (not shown) and the other end connected to the first cylinder 24a the cylinder block 12.

The intake port 20 allows air drawn from an inlet (not shown) and flowing through the intake manifold to be introduced into the first cylinder 24a. The intake valve 22 is disposed at the connection of the intake port 20 and the first cylinder 24a. The intake valve 22 is operable in sync with the rotation of the crank shaft to permit and shut off the communication between the intake port 20 and the first cylinder 24a.

The exhaust port 30 allows gas discharged from the first cylinder 24a to be flowed to the exhaust manifold. An exhaust valve 26 is disposed at the connection of the exhaust port 30 and the first cylinder 24a. As with the intake valve 22, the exhaust valve 26 is operable in sync with the rotation of the crank shaft to permit and shut off the communication between the exhaust port 30 and the first cylinder 24a.

A fuel injection valve 28 is disposed in the cylinder head 18 at a position corresponding to the axis of the first cylinder 24a. The fuel injection valve 28 is connected to a common rail (not shown), and high-pressure fuel stored in the common rail is supplied to the fuel injection valve 28. The fuel injection valve 28 is operable in response to a control signal from the ECU 200 and directly supplies fuel in to a combustion chamber formed in the first cylinder 24a above the piston 14. The fuel injection valve 28 has a cylindrical shape and is inserted in a circular hole formed in the cylinder head 18. The fuel injection valve 28 has an injection end portion 32 from which fuel is injected, and the injection end portion 32 is disposed exposed to the inner space formed in the first cylinder 24a. The first cylinder pressure sensor 34a is disposed in the cylinder head 18 and located at the upper part of the first cylinder 24a.

The configuration of the first cylinder 24a has been described with reference to FIG. 2. The same configuration is true for the second, third and fourth cylinders, 24b, 24c, 24d and, therefore, the description thereof will not be repeated.

Referring to FIGS. 1 and 2, the ECU 200 includes a central processing unit (CPU) 148 for performing various processes, a memory 150 for storing programs, data, and processing results of the CPU 148, and input and output ports (neither shown) through which data is transferred to and from external devices. The CPU 148 is operable to calculate a command fuel injection amount for each cylinder based on operating conditions of the engine 10 and controlling each fuel injection device based on the calculated command fuel injection amount. The CPU 148 corresponds to the controller of the present disclosure. The memory 150 may be provided by a read only memory (ROM) and a random access memory (RAM) having therein at least a rewritable storage area. The memory 150 corresponds to the memory of the present disclosure.

The ECU 200 receives signals from various devices such as sensors connected to the input port and controls various devices (e.g., the fuel injection valve 28) connected to the outlet port based on the received signals.

The various sensors connected to the input port include the first, second, third, fourth cylinder pressure sensors 34a, 34b, 34c, 34d, a G sensor 300, a vehicle speed sensor 302, and an accelerator opening sensor 304.

The first, second, third, fourth cylinder pressure sensors 34a, 34b, 34c, 34d measure the cylinder pressures in the first, second, third, and fourth cylinders 24a, 24b, 24c, 24d, respectively, and generates signals that are indicative of the measured cylinder pressures to the ECU 200.

The G sensor 300 measures acceleration of the vehicle 1 in the longitudinal, vertical and lateral directions of the vehicle 1. The G sensor 300 outputs a signal that is indicative of the measured acceleration in the longitudinal direction of the vehicle 1, a signal that is indicative of the measured acceleration in the vertical direction of the vehicle 1, and a signal that is indicative of the measured acceleration in the lateral direction of the vehicle 1 to the ECU 200. The G sensor 300 corresponds to the vibration detector detecting a vibration of the vehicle of the present disclosure.

The vehicle speed sensor 302 measures the speed of the vehicle 1 and generates a signal that is indicative of the measured speed of the vehicle 1 to the ECU 200.

The accelerator opening sensor 304 measures the depression of the accelerator pedal (not shown), and generates a signal that is indicative of the opening of the accelerator to ECU 200.

In the vehicle 1 having the above-described configuration, vibration of the vehicle 1 may be caused by the engine 10. If the frequency of the vibration generated by the engine 10 is within the resonance range of the vehicle 1, for example, it causes relatively large vibration to the vehicle 1 in the longitudinal direction of the vehicle 1 (longitudinal vibration of the vehicle 1), which may be unpleasant for a driver of the vehicle 1. In order to suppress such vibration of the vehicle 1, it may be contemplated to obtain a vibration component of the rotation speed of the engine 10 and adjust the control parameter of the engine 10 such as fuel injection amount so as to reduce the obtained vibration component.

If there is an error between a command value for the engine 10 to generate the desired torque to suppress the vibration component and the actual torque that is generated based on the command value, however, the vibration component may not be reduced effectively, which prevents achieving the desired vibration suppression performance of the vehicle 1.

In the present embodiment, the ECU 200 is configured to operate in the following manner. Specifically, when the vehicle 1 is being driven in the normal driving condition, the ECU 200 (CPU 148) obtains data of the longitudinal vibration of the vehicle 1 from the G sensor 300. The ECU 200 (CPU 148) analyses the obtained data of the longitudinal vibration and determines whether a vibration level corresponding to a reference frequency band, which is set depending on the rotation speed of the engine 10, is greater than a vibration level threshold with regard to the data of the longitudinal vibration of the vehicle 1. If it is determined that the obtained vibration level is greater than the vibration level threshold, the ECU 200 (CPU 148) calculates a torque generated by each cylinder, and also calculates a correction amount for fuel injection amount for each cylinder so that the torque difference among the plurality of the cylinders is reduced. Based on the calculated correction amount, the ECU 200 (CPU 148) corrects the command fuel injection amount for each cylinder and controls each fuel injection device based on the corrected command fuel injection amount. The ECU 200 (CPU 148) stores the correction amount for each cylinder in the memory 150.

In this way, the fluctuation of the torque of the engine 10 may be suppressed. As a result, the longitudinal vibration of the vehicle 1 caused by the fluctuation of the torque of the engine 10 may be suppressed.

Figure 3:
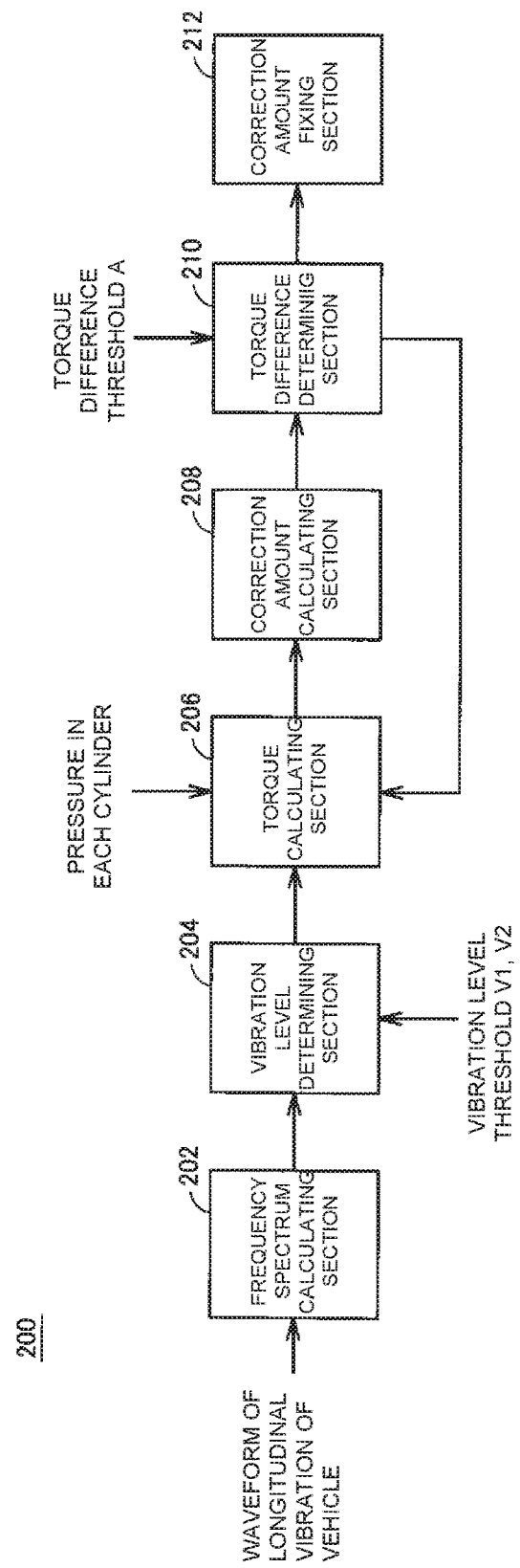
FIG. 3 is a block diagram showing various arithmetic processing sections provided in an ECU.

Referring to FIG. 3, there is shown a block diagram showing various arithmetic processing sections in the ECU 200 (CPU 148), namely, a frequency spectrum calculating section 202, a vibration level determining section 204, a torque calculating section 206, a correction amount calculating section 208, a torque difference determining section 210, and a correction amount fixing section 212.

Figure 4:
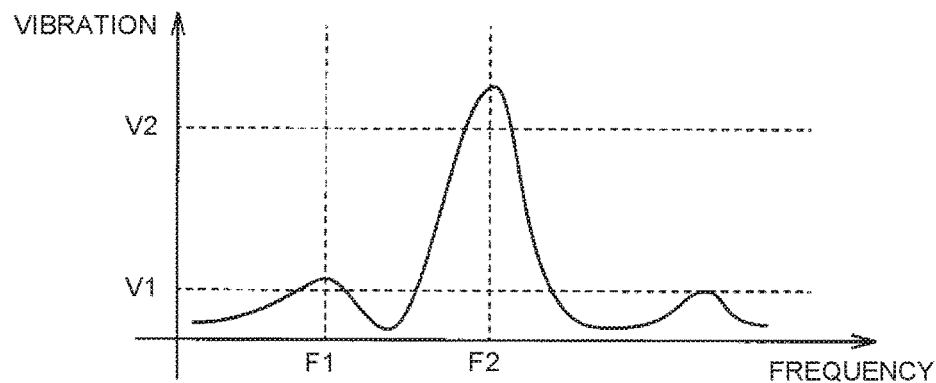
FIG. 4 is a chart showing a frequency spectrum of a waveform of vibration of the vehicle in the longitudinal direction thereof.

The frequency spectrum calculating section 202 (CPU 148) obtains data of vibration in the longitudinal direction of the vehicle 1 based on a signal that is received from the G sensor 300 and indicative of the longitudinal acceleration of the vehicle 1. In the present embodiment, the frequency spectrum calculating section 202 obtains the waveform of the frequency from the signal indicating the longitudinal acceleration of the vehicle 1 and obtains the frequency spectrum of the longitudinal vibration of the vehicle 1, which represents the data of vibration, through the frequency analysis of such waveform of the vibration. The frequency spectrum calculating section 202 obtains the frequency spectrum shown in FIG. 4, for example, by Fourier transform of the waveform of the longitudinal vibration of the vehicle 1 for a predetermined period of time. FIG. 4 shows the frequency spectrum of the waveform of the longitudinal vibration of the vehicle 1 in which the horizontal axis represents the frequency and the vertical axis represents the vibration level (degree of the vibration), respectively.

The vibration level determining section 204 (CPU 148) determines whether the vibration level in the frequency spectrum shown in FIG. 4 corresponding to the reference frequency band is greater than a threshold for the vibration level (vibration level threshold). Specifically, the vibration level determining section 204 compares the vibration level corresponding to the reference frequency band and the vibration level threshold that is set depending on the reference frequency band to determine whether the vibration level corresponding to the reference frequency band is greater than the vibration level threshold.

The reference frequency bands are set for the frequency bands depending on the rotation speed of the engine 10. For example, the reference frequency bands include a first frequency band corresponding to the 0.5 order vibration of the engine 10, a second frequency band corresponding to the 1 order vibration of the engine 10, and a third frequency band corresponding to the 2 order vibration of the engine 10. In the present embodiment, the reference frequency band includes the first frequency band and the second frequency band. The vibration level threshold is set for each reference frequency band, namely, the first vibration level threshold V1 for the first frequency band and the second vibration level threshold V2 for the second frequency band.

The vibration level determining section 204 determines the maximum value of the vibration level in the first frequency band of the frequency spectrum (hereinafter referred to as the first maximum value) and the maximum value of the vibration level in the second frequency band of the frequency spectrum (hereinafter referred to as the second maximum value). The vibration level determining section 204 determines whether the first maximum value is greater than the first vibration level threshold V1, or determines whether the second maximum value is or greater than the second vibration level threshold V2. The vibration level thresholds V1 and V2 are provided for the determination of whether the vibration caused by the engine 10 occurs and is set based on the experimental results and design requirement.

In FIG. 4, F1 indicates the frequency in the first frequency band at which the vibration level becomes the first maximum value and F2 represents the frequency in the second frequency band at which the vibration level becomes the second maximum value, FIG. 4 shows a state in which the frequencies F1, F2 are greater than the first vibration level threshold V1 and the second vibration level threshold V2, respectively.

If the vibration level determining section 204 determines that the first maximum value is greater than the first vibration level threshold V1, or the second maximum value is greater than the second vibration level threshold V2, the occurrence of longitudinal vibration caused by the engine 10 is determined and, consequently, a vibration suppression control is carried out. In the vibration suppression control, the torque calculating section 206 (CPU 148) calculates a torque generated by each of the first, second, third, fourth cylinders 24a, 24b, 24c, 24d. In the following description, Tr1, Tr2, Tr3, Tr4 represent the torques generated by the first, second, third, fourth cylinders 24a, 24b, 24c, 24d, respectively.

The torque calculating section 206 (CPU 148) calculates the torques Tr1, Tr2, Tr3, Tr4 of the first, second, third, fourth cylinders 24a, 24b, 24c, 24d, respectively, based on the respective pressures in the first, second, third, fourth cylinders 24a, 24b, 24c, 24d.

Specifically, the torque calculating section 206 calculates the torques Tr1, Tr2, Tr3, Tr4 based on the result of comparison between the waveform of pressure in the cylinder while combustion is taking place and the waveform of pressure in the cylinder while no combustion is taking place.

Figure 5:
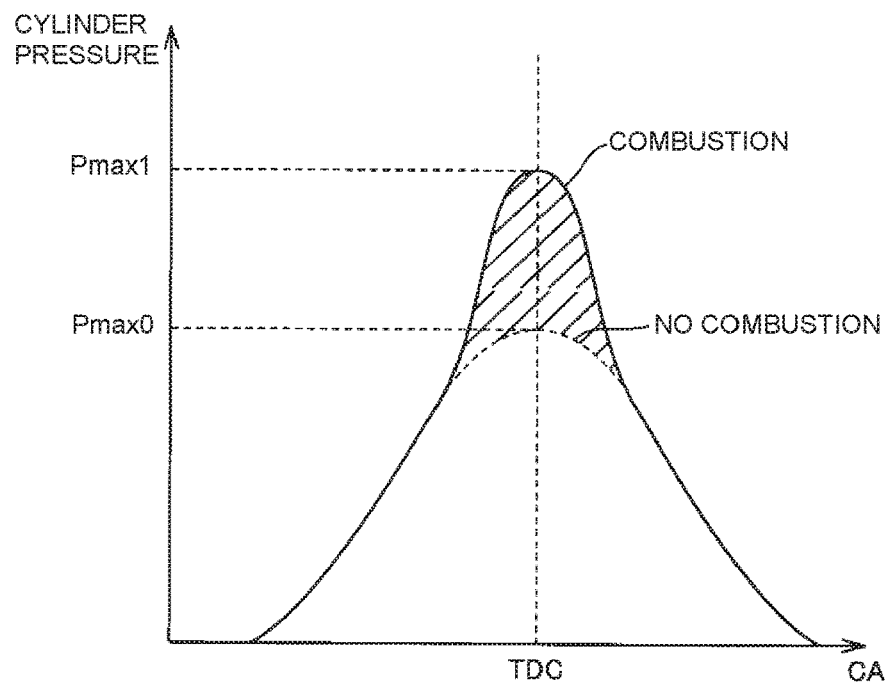
FIG. 5 is a chart illustrating a method for calculating a torque generated by combustion in the cylinder by using pressure in the cylinder.

FIG. 5 provides a chart that describes a method for calculating the torque generated by the combustion in the cylinder using value of the cylinder pressure. In FIG. 5, the vertical and the horizontal axes represent the cylinder pressure and the crank angle, respectively. Additionally, the solid line in the chart indicates the relationship between the crank angle and the pressure in the cylinder while combustion is taking place in the cylinder and the dashed line indicates the relationship between the crank angle and the pressure in the cylinder while no combustion is taking place in the cylinder, thus showing the difference in the cylinder pressure between while combustion is taking place in the cylinder and while no combustion is taking place in the cylinder.

As shown in FIG. 5, the peak of the waveform representing the pressure in the cylinder while combustion is taking place in the cylinder is increased by combustion energy (which is indicated by the hatched portion in FIG. 5), as compared with the peak of the waveform of the pressure in the cylinder while no combustion is taking place. As shown in FIG. 5, when the crank angle is at the top dead center (TDC), the maximum value of the cylinder pressure while no combustion is taking place is at Pmax0 and the maximum valve of the cylinder pressure while combustion is taking place is Pmax1 which is greater than the Pmax0.

The combustion energy excluding mechanical loss such as friction and cooling loss corresponds to the work (i.e., torque) that presses down the piston 14.

The torque calculating section 206 calculates, for example, the area surrounded by the solid line indicating the cylinder pressure while combustion is taking place and the dashed line indicating the cylinder pressure while no combustion is taking place within a crank angle range including the top dead center (the hatched portion in FIG. 5) as the combustion energy. Alternatively, the torque calculating section 206 may be configured to calculate the combustion energy by subtracting a value of integral of the cylinder pressure within a predetermined crank angle range while combustion is taking place from a value of integral of the cylinder pressure within a predetermined crank angle range while no combustion is taking place.

The torque calculating section 206 calculates a value by subtracting mechanical loss and cooling loss from the calculated combustion energy and takes the calculated value as the torque generated by the cylinder. It is noted that the torque calculating section 206 calculates the mechanical loss and the cooling loss based on the operating conditions of the engine 10 (e.g., engine speed and the cooling water temperature). The torque calculating section 206 calculates the mechanical loss and the cooling loss, for example, using a map representing the relationship between the engine speed and the mechanical loss and a map representing the relationship between the cooling water temperature and the cooling loss.

The correction amount calculating section 208 (CPU 148) calculates to calculate a correction amount for the command fuel injection amount for each of the first, second, third and fourth cylinders 24a, 24b, 24c, 24d based on the respective torques Tr1, Tr2, Tr3, T4 calculated by the torque calculating section 206.

Specifically, the correction amount calculating section 208 (CPU 148) calculates the average value of the torques Tr1, Tr2, Tr3, T4 (average torque) and calculates a correction amount for each cylinder so that the torques of the first, second, third and fourth cylinders 24a, 24b, 24c, 24d approximate to the average value.

The correction amount calculating section 208 calculates the average torque Tr0 by dividing the sum of the torques Tr1, Tr2, Tr3, T4 by the number of the cylinders (four). In other words, the correction amount calculating section 208 calculates the average torque based on the torques Tr1, Tr2, Tr3, T4 of the first, second, third and fourth cylinders 24a, 24b, 24c, 24d. Then, the correction amount calculating section 208 calculates a correction amount for the command fuel injection amount for each of the first, second, third and fourth cylinders 24a, 24b, 24c, 24d based on their respective differences with respect to the average torque Tr0.

Figure 6:
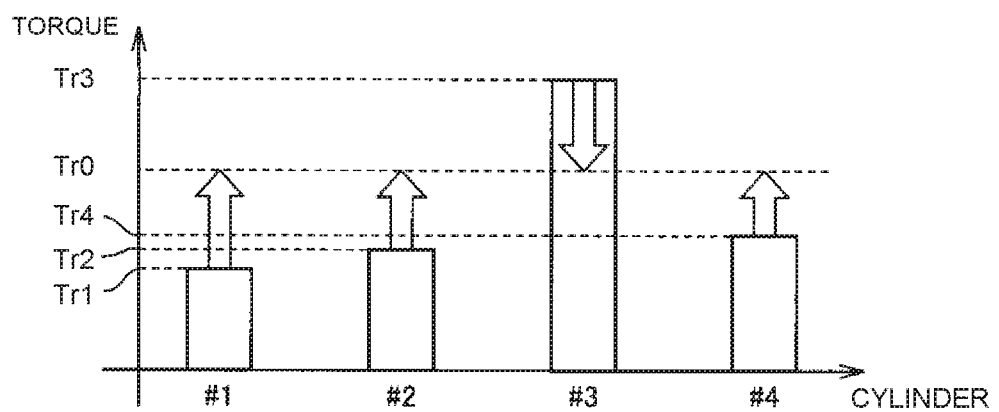
FIG. 6 is a chart illustrating a method for calculating a correction amount for command fuel injection amount.

FIG. 6 provides a chart that describes a method for calculating the correction amount for the command fuel injection amount. In FIG. 6, the vertical axis represents the torque and the cylinders 24a, 24b, 24c, 24d are indicated on the horizontal axis. The torques Tr1, Tr2, Tr3, T4 of the first, second, third and fourth cylinders 24a, 24b, 24c, 24d in FIG. 6 are generated at a specific point of time.

The correction amount calculating section 208 (CPU 148) calculates a correction torque amount for the first cylinder 24a by subtracting the torque Tt1 of the first cylinder 24a from the average torque Tr0, and calculates the correction amount for the command fuel injection amount for the first cylinder 24a based on the calculated correction torque amount. The correction amount calculating section 208 calculates the correction amount for the command injection fuel amount based on a map, a table, or a formula representing a relationship between the correction torque amount and the correction amount for the command fuel injection amount, which data may be prepared based on experimental results and stored in the memory 150.

Similarly, the correction amount calculating section 208 calculates the correction torque amount for the second cylinder 24b by subtracting the torque Tr2 of the second cylinder 24b from the average torque Tr0, and calculates the correction amount for the command fuel injection mount for the second cylinder 24b based on the calculated correction torque amount. The correction amount calculating section 208 calculates the correction torque amount for the third cylinder 24c by subtracting the torque Tri of the third cylinder 24c from the average torque Tr0, and calculates the correction amount for the command fuel injection mount for the third cylinder 24c based on the calculated correction torque amount. The correction amount calculating section 208 calculates the correction torque amount for the fourth cylinder 24d by subtracting the torque Tr4 of the fourth cylinder 24d from the average torque Tr0, and calculates the correction amount for the command fuel injection mount for the fourth cylinder 24d based on the calculated correction torque amount. The calculations of the correction amounts for the second, third and fourth cylinders 24b, 24c, 24d may be made in the same manner as the calculation of correction amount for the first cylinder 24a and, therefore, the description thereof will not be repeated.

The torque difference determining section 210 (CPU 148) calculates the torques Tr1, Tr2, Tr3, Tr4 occurring in the next combustion cycle in which the correction amounts for the command fuel injection amounts calculated by the correction amount calculating section 208 are reflected. The torque difference determining section 210 further calculates the difference between the maximum value of the calculated torques Tr1, Tr2, Tr3, Tr4 and the minimum value of the calculated torques Tr1, Tr2, Tr3, Tr4 as a torque difference.

The torque difference determining section 210 determines whether the calculated torque difference is equal to or less than a torque difference threshold A. The torque difference threshold A is set to determine whether the torque difference among the cylinders is effectively reduced. The torque difference threshold A is prepared based on the experimental results.

If it is determined by the torque difference determining section 210 that the calculated torque difference is equal to or less than the torque difference threshold A, the correction amount fixing section 212 determines that the torque difference among the cylinders 24a, 24b, 24c, 24d is reduced sufficiently and fixes the correction amounts for the respective cylinders 24a, 24b, 24c, 24d Once the correction amounts for the cylinders 24a, 24b, 24c, 24d are fixed, the fuel injection control is carried out based on the fixed correction amounts until the new correction amounts are calculated. If the torque difference determining section 210 determines that the torque difference is greater than the torque difference threshold A, on the other hand, it is determined that the torque difference among the cylinders 24a, 24b, 24c, 24d is not reduced sufficiently, so that the calculation of the torques by the torque calculating section 206 and the calculation of the correction amounts by the correction amount calculating section 208 are performed again.

Figure 7:
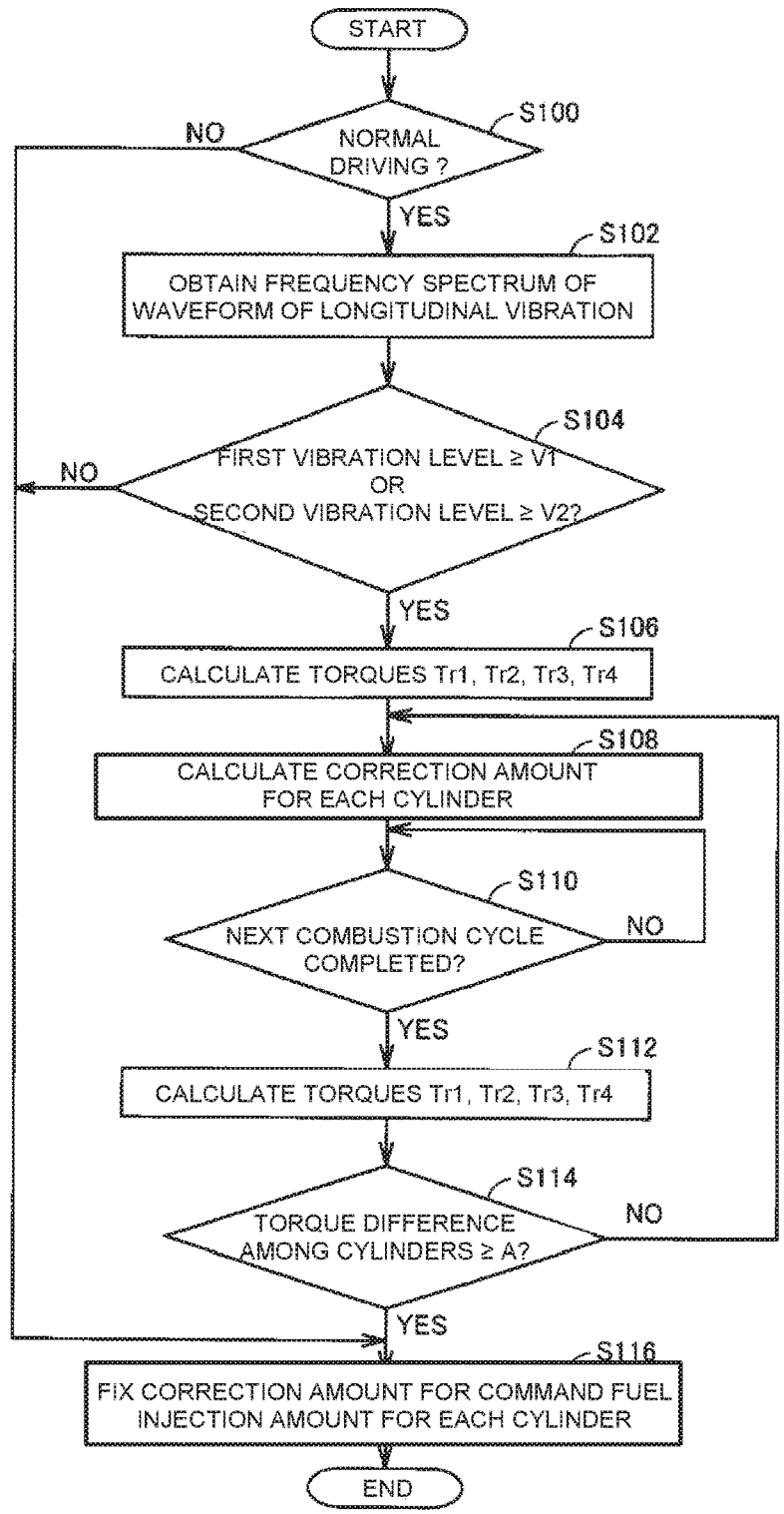
FIG. 7 is a flow chart showing a control process which is carried out by the ECU.

The following will describe a control process carried out by the ECU 200 that serves as the vibration suppression device of the vehicle with reference a flow chart of the control process shown in FIG. 7.

As shown in FIG. 7 and at Step S100, the ECU 200 (CPU 148) determines whether the vehicle 1 is in the normal driving condition. The ECU 200 determines that vehicle 1 is in the normal driving condition, for example, when the change in the opening of the accelerator for a predetermined period (e.g. per unit time) is equal to or less than a threshold for the determination of the operation of the accelerator pedal, when the amplitude of the vibration, which indicates the change in the vertical acceleration detected by the G sensor 300, is equal to or less than a threshold for the determination of whether the vehicle 1 is being driven on a rough road, and when the change in the speed of the vehicle 1 for a predetermined period (e.g. per unit time), which is measured by the vehicle speed sensor 302, is equal to and less than a threshold for the determination of the change in the speed of the vehicle 1. If the ECU 200 determines that the vehicle 1 is being driven in the normal driving condition (if YES at Step S100), the control process proceeds to Step S102.

At Step S102, the ECU 200 calculates the frequency spectrum of the waveform of the longitudinal vibration of the vehicle 1 detected by the G sensor 300.

At Step S104, the ECU 200 determines whether the first vibration level corresponding to the first frequency band is equal to or greater than the first vibration level threshold V1, and also determines whether the second vibration level corresponding to the second frequency band is equal to or greater than the second vibration level threshold V2. If it is determined that either the first vibration level corresponding to the first frequency band is equal to or greater than the first vibration level threshold V1, or the second vibration level corresponding to the second frequency band is equal to or greater than the second vibration level threshold V2 (YES at Step S104), the control process proceed to Step S106.

At Step S106, the ECU 200 calculates the torques Tr1, Tr2, Tri, Tr4 generated by the first, second, third, fourth cylinders 24a, 24b, 24c, 24d, respectively, based on the pressures in the respective first, second, third, fourth cylinders 24a, 24b, 24c, 24d. The calculation method of the torques Tr1, Tr2, Tr3, Tr4 has been described above and, therefore, the description thereof will not be repeated.

At Step S108, the ECU 200 calculates the correction amount for the command fuel injection mount for each of the first, second, third, fourth cylinders 24a, 24b, 24c, 24d. At Step S110, the ECU 200 determines whether the combustion cycle in which the calculated correction amounts are applied to the command fuel injection amounts for the first, second, third, fourth cylinders 24a, 24b, 24c, 24d is completed. If the ECU 200 determines that combustion cycle with the corrected command fuel injection amounts for the first, second, third, fourth cylinders 24a, 24b, 24c, 24d is completed, the control process proceeds to Step S112.

At Step S112, the ECU 200 calculates the torques Tr1, Tr2, Tr3, Tr4 generated by the first, second, third, fourth cylinders 24a, 24b, 24c, 24d, respectively.

At Step S114, the ECU 200 determines whether the torque difference among the first, second, third, fourth cylinders 24a, 24b, 24c, 24d is equal to or less than the torque difference threshold A. If it is determined that the torque difference among the first, second, third, fourth cylinders 24a, 24b, 24c, 24d is equal to or less than the torque difference threshold A (YES at Step S114), the control process proceeds to Step S116. At Step S116, the ECU 200 fixes the correction amounts for the first, second, third, fourth cylinders 24a, 24b, 24c, 24d.

The control process ends if the ECU 200 determines that vehicle 1 is not in the normal driving conditions (NO at Step S100), or if the ECU 200 determines that the first vibration level is smaller than the first vibration level threshold V1 and the second vibration level is smaller than the second vibration level threshold V2 (NO at Step S104).

If the ECU 200 determines that the combustion cycle in which the correction amounts calculated at Step S108 are applied is not completed (NO at Step S110), the control process returns to Step S110 and will be on standby until the next combustion cycle completed.

If the ECU 200 determines that the torque difference among the cylinders is greater than the torque difference threshold A (NO at Step S114), the control process returns to Step S108 and recalculates the correction amounts for each of the first, second, third and fourth cylinder 24a, 24b, 24c, 24d.

Figure 8:
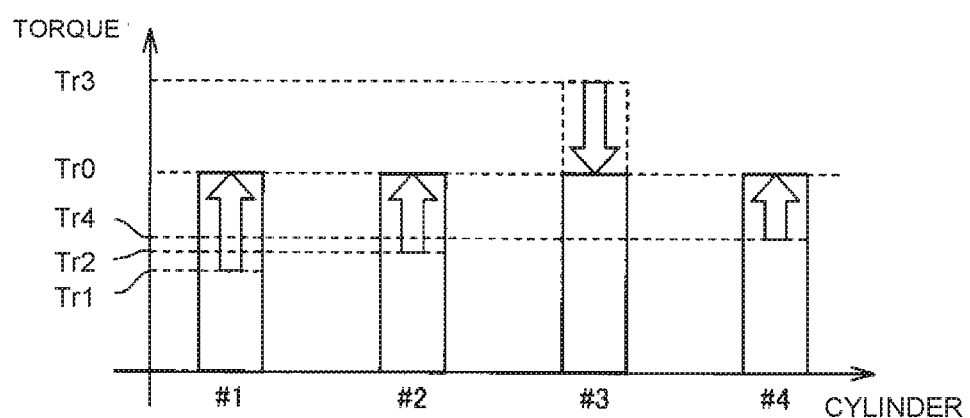
FIG. 8 is a chart illustrating an operation of the ECU.

The following will describe the operation of the ECU 200 that serves as the control device of the vehicle 1 having the above described configuration with reference to FIG. 8 in which the vertical axis indicates the torque and the cylinder numbers #1, #2, #3, #4 are indicated on the horizontal axis.

When the vehicle 1 is in the normal driving condition (YES at Step S100), the frequency spectrum of the waveform of the longitudinal vibration of the vehicle 1 is calculated (Step S102). Based on the calculated frequency spectrum, it is determined whether the first vibration level corresponding to the first frequency band representing the vibration of the 0.5 order of the engine 10 is equal to or greater than the first vibration level threshold V1, and whether the second vibration level corresponding to the second frequency band representing the vibration of the 1 order of the engine 10 is equal to or greater than the second vibration level threshold V2 (S104). These steps of the control process permits determining whether or not the longitudinal vibration of the vehicle 1 caused by the engine 10 is occurring. If it is determined that the first vibration level is equal to or greater than the first vibration level threshold V1 or the second vibration level is equal to or greater than the second vibration level threshold V2 (YES at Step S104), the torques Tr1, Tr2, Tr3, Tr4 generated by the first, second, third and fourth cylinders 24a, 24b, 24c, 24d are calculated (S106).

The average torque Tr0 is calculated based on the calculated torques Tr1, Tr2, Tr3, Tr4, and the correction amount for the command fuel injection amount for each cylinder 24a, 24b, 24c, 24d is calculated based on the differences between the average torque Tr0 and the torque Tr1, between the average torque Tr0 and the torque Tr2, between the average torque Tr0 and the torque Tr3, and between the average torque Tr0 and the torque Tr4 (S108).

The fuel injection control for the next combustion cycle is carried out using the correction amounts at the next combustion cycle. If the next combustion cycle is determined to be completed (YES at Step S110), the torques Tr1, Tr2, Tr3, Tr4 of the first, second, third and fourth cylinders 24a, 24b, 24c, 24d are calculated again (S112). If the torque difference is equal to or less than the torque difference threshold A and hence the torques Tr1, Tr2, Tr3, Tr4 are approximated to the average torque Tr0 (YES at S114), it is determined that the torque difference among the cylinders are sufficiently small, and the correction amount for each cylinder is fixed (S116). Such fixed correction amount is used for the subsequent fuel injection control. If the torque difference among the cylinders is greater than the torque difference threshold A (NO at Step S114), it is determined that the torque difference among the cylinders 24a, 24b, 24c, 24d is not reduced sufficiently, so that the correction amount for each cylinder is calculated again based on the calculated torques Tr1, Tr2, Tr3, Tr4 (Step S108).

In the vibration suppression device of the vehicle 1 of the present embodiment, the occurrence of the longitudinal vibration of the vehicle 1 caused by the fluctuation of the torque of the engine 10 is determined if the first vibration level is greater than the first vibration level threshold V1, or the second vibration level is greater than the second vibration level threshold V2. For the reduction of the torque difference among the cylinder 24a, 24b, 24c, 24d, the correction amount for the command fuel injection amount for each cylinder 24a, 24b, 24c, 24d is calculated. The fuel injection control is performed by using the calculated correction amount for each cylinder 24a, 24b, 24c, 24d so as to suppress the fluctuation of the torque of the engine 10. Thus, the longitudinal vibration of the vehicle 1 caused by the fluctuation of the torque of the engine 10 may be suppressed. Therefore, the present embodiment provides a vibration suppression device of a vehicle that adequately controls the engine 10 so as to suppress the vibration of the vehicle.

Since the correction amounts for the command fuel injection amount for the first, second, third and fourth cylinders 24a, 24b, 24c, 24d are calculated so that the torques Tr1, Tr2, Tr3, Tr4 approximate to the average torque Tr0, the torque difference among the plurality of cylinders is reduced and the fluctuation of the total of the torque generated by the plurality of cylinders is suppressed accordingly, thus the fluctuation of the torque of the engine 10 being prevented.

In addition, the vibration suppression device repeatedly performs the calculation of the correction amounts for each cylinder until the torque difference among the plurality of cylinders becomes equal to or less than the torque difference threshold A, so that the plurality of the correction amounts that cancels off the torque difference among the plurality of cylinders may be calculated. Thus, the fluctuation of the torque of the engine 10 may be suppressed.

The torques generated by each cylinder 24a, 24b, 24c, 24d may be calculated with high accuracy based on the results of comparison between the waveforms of the pressures in the cylinders 24a, 24b, 24c, 24d while combustion is taking place and the waveforms of the pressures in the cylinders 24a, 24b, 24c, 24d while no combustion is taking place. As a result, the torque difference among the cylinder 24a, 24b, 24c, 24d may be calculated accurately. Thus, the fluctuation of the torque of the engine 10 may be suppressed.

The occurrence of the vibration of the vehicle 1 caused by the fluctuation of the torque of the engine 10 may be accurately determined by comparing at least one of the first frequency band corresponding to the 0.5 order engine vibration, the second frequency band corresponding the 1 order engine vibration, and the third frequency band corresponding to the 2 order engine vibration with their associated vibration level thresholds.

The following will describe a modified embodiment of the present disclosure.

The first, second, third and fourth cylinder pressure sensors 34a, 34b, 34c, 34d need not necessarily be disposed in the cylinder head 18 adjacently to the top of the first, second, third and fourth cylinders 24a, 24b, 24c, 24d, respectively, but these sensors may be disposed at any suitable positions as long as the pressures in the first, second, third and fourth cylinders 24a, 24b, 24c, 24d can be measured. For example, the first, second, third and fourth cylinder pressure sensors 34a, 34b, 34c, 34d may be disposed in a part of side surface at a position which is not reached by the piston 14. If a glow plug is provided in the engine, the cylinder pressure sensor may be disposed near the glow plug.

In the above-described embodiment, the torque is calculated based on the difference in the area between the area obtained by the waveform of the pressure in the cylinder while combustion is taking place and the area obtained by the waveform of the pressure in the cylinder while no combustion is taking place (or between the area surrounded by the waveform of the pressure in the cylinder while combustion is taking place and the waveform of the pressure in the cylinder while no combustion is taking place in the cylinder). According to the present embodiment, however, the torque may be calculated based on the difference between the maximum cylinder pressure Pmax1 while combustion is taking place in the cylinder and the maximum cylinder pressure Pmax0 while no combustion is taking place (Pmax1−Pmax0).

Although the foregoing description has dealt with a four cylinder engine as the engine 10, the present disclosure is applicable to any engine equipped with a plurality of cylinders.

In the above-described embodiment, the occurrence of the longitudinal vibration of the vehicle 1 caused by the operation of the engine 10 is determined if at least one of the vibration level at the frequency band corresponding to the 0.5 order vibration of the engine 10 and the vibration level at the frequency band corresponding to the 1 order vibration of the engine 10 is greater than their associated vibration level threshold. It may be so configured that the determination of the occurrence of the longitudinal vibration of the vehicle 1 caused by the operation of the engine 10 is made if all of the vibration level at the frequency band corresponding to the 0.5 order vibration of the engine 10, the vibration level at the frequency band corresponding to the 1 order vibration of the engine 10, and the vibration level at the frequency band corresponding to the 2 order vibration of the engine 10 are greater than their associated vibration level thresholds. Alternatively, it may be so configured that the occurrence of the longitudinal vibration of the vehicle 1 caused by the operation of the engine 10 is made if at least one of the vibration level at the frequency band corresponding to the 0.5 order vibration of the engine 10, the vibration level at the frequency band corresponding to the 1 order vibration of the engine 10, and the vibration level at the frequency band corresponding to the 2 order vibration of the engine 10 is greater than their associated vibration level thresholds. Alternatively, it may be so configured that the occurrence of the longitudinal vibration of the vehicle 1 caused by the operation of the engine 10 is made if at least two of the vibration level at the frequency band corresponding to the 0.5 order vibration of the engine 10, the vibration level at the frequency band corresponding to the 1 order vibration of the engine 10, and the vibration level at the frequency band corresponding to the 2 order vibration of the engine 10 are greater than their associated vibration level thresholds. For example, the occurrence of the longitudinal vibration of the vehicle 1 caused by the operation of the engine 10 may be determined if the vibration level at the frequency band corresponding to the 0.5 order vibration of the engine 10 and the vibration level at the frequency band corresponding to the 1 order vibration of the engine 10 are greater than their associated thresholds.

In the above-described embodiment, the determination of whether the vehicle 1 is in the normal conditions is made based on the opening of the accelerator, the amplitude of vibration indicated by a change in the acceleration in the vertical direction of the vehicle 1, and the speed of the vehicle 1. However, the vibration suppression device of the vehicle may be configured to determine whether the vehicle 1 is in the normal condition based on at least one of the opening of the accelerator, the amplitude of vibration in the vertical direction of the vehicle 1, and the speed of the vehicle 1. Alternatively, in addition to the above-mentioned conditions, the controller is configured to determine that the vehicle 1 is in the normal conditions when a change in the rotation speed of the engine 10 per unit time is equal to or less than a threshold value, or when a change in the gear ratio per unit time is equal to or less than a threshold value.

In the above-described embodiment, the vibration suppression device of the vehicle is configured to perform the calculation of the correction amount for the command fuel injection amount if it is determined that the vehicle 1 is in the normal condition and the vibration level corresponding to the reference frequency band is equal to or greater than the vibration level threshold. In addition to the above conditions for the calculation of the correction amount for the command fuel injection amount, the calculation may be performed after an elapse of a predetermined period of time since the previous fixing of the correction amount for the command fuel injection amount.

Although the foregoing description has deal with the engine 10 equipped with a direct injection device that directly injects fuel into the combustion chamber, the engine 10 may be a gasoline engine equipped with a fuel injection device that injects fuel to the intake port.

In the above-described embodiment, the vibration suppression device of the vehicle calculates the frequency spectrum of the waveform of the longitudinal vibration of the vehicle 1 and determines whether the first frequency band is equal to or greater than the first vibration level threshold V1, or the second frequency band is equal to or greater than the second vibration level threshold V2 based on the calculated frequency spectrum for the determination of the occurrence of the longitudinal vibration of the vehicle 1 caused by the engine 10. Instead, the waveform of the longitudinal vibration of the vehicle 1 is filtered by using a filter such as a band path filter to extract the waveforms at the first frequency band and the second frequency band, and the determination is made for whether the maximum value of the amplitude of the waveform at the first frequency band is equal to or greater than the first vibration level threshold V1 or the maximum value of the amplitude of the waveform at the second frequency band is equal to or greater than the second vibration level threshold V2.

In the above-described embodiment, the vibration suppression device of the vehicle is configured to determine the occurrence of the vibration of the vehicle 1 caused by the fluctuation of the torque of the engine 10 by determining whether the maximum value of the vibration level corresponding to the reference frequency band is equal to or greater than the threshold. However, the vibration suppression device of the vehicle may be configured to determine the occurrence of the vibration of the vehicle 1 caused by the fluctuation of the torque of the engine 10 by calculating an integral value of the vibration level corresponding to the reference frequency band and determining whether the calculated integral value of the vibration level is greater than a threshold.

In the above-described embodiment, the reference frequency bands include the first frequency band corresponding to the 0.5 order engine vibration and the second frequency band corresponding to the 1 order engine vibration. According to the present disclosure, however, the vibration suppression device of the vehicle is configured to includes at least one of a first frequency band corresponding to the 0.5 order engine vibration, a second frequency band corresponding to the 1 order engine vibration and a third frequency band corresponding to the 2 order engine vibration, and the vibration threshold value is set for each frequency band.

In the above modified embodiments, the control process may be performed with combination of any steps or all of the steps. The above-described embodiments of the present disclosure are examples and not intended to limit the scope of the present disclosure. The scope of the present invention is to be construed not by the above description but by claims and intended to include any modification corresponding to the scope of the claims.

What is claimed is:

1. A vibration suppression device of a vehicle having an engine that includes a plurality of cylinders, each having a fuel injection device for fuel injection, the vibration suppression device comprising:
   a controller configured to calculate a command fuel injection amount for each cylinder based on operating conditions of the engine and configured to control each fuel injection device based on the calculated command fuel injection amount;
   a memory having stored therein a correction amount for a fuel injection amount for each cylinder; and
   a vibration detector configured to detect a vibration of the vehicle, wherein
   the controller is further configured to:
      determine whether the vehicle is operating in a normal driving condition,
      obtain data of a longitudinal vibration of the vehicle from the vibration detector when the controller determines that the vehicle is operating in the normal driving condition,
      determine whether a vibration level corresponding to a reference frequency band is greater than a vibration level threshold with regard to the data of the longitudinal vibration of the vehicle, wherein the reference frequency band is set depending on a rotation speed of the engine,
      calculate a torque generated by each cylinder and the correction amount for the fuel injection amount for each cylinder so that a torque difference among the plurality of cylinders is reduced when the vibration level corresponding to the reference frequency band is greater than the vibration level threshold, and
      correct the command fuel injection amount for each cylinder based on the calculated correction amount, control each fuel injection device based on the corrected command fuel injection amount, and store calculated correction amount in the memory.

2. The vibration suppression device of the vehicle according to claim 1, wherein the controller is further configured to calculate an average torque of the plurality of cylinders based on the torques of the plurality of cylinders, and calculate the correction amount for each cylinder so that the torque of each cylinder approximates the average torque.

3. The vibration suppression device of the vehicle according to claim 1, wherein the controller is further configured to repeatedly perform a calculation of the correction amount for each cylinder until the torque difference becomes equal to or less than a torque difference threshold.

4. The vibration suppression device of the vehicle according to claim 1, wherein the controller is further configured to calculate the torques of the plurality of cylinders based on a result of comparison between a waveform of a pressure in the cylinder while combustion is taking place and the waveform of the pressure in the cylinder while no combustion is taking place, and calculate the torque difference between a maximum value of the calculated torques and a minimum value of the calculated torques.

5. The vibration suppression device of the vehicle according to claim 1, wherein the reference frequency band includes at least one of a first frequency band corresponding to an 0.5 order engine vibration, a second frequency band corresponding to a 1 order engine vibration, and a third frequency band corresponding to a 2 order engine vibration, and the vibration level threshold is set for each reference frequency band.

\* \* \* \* \*